United States Patent [19]

Olender et al.

[11] Patent Number: 5,780,724
[45] Date of Patent: Jul. 14, 1998

[54] PHOTO-ACOUSTIC LEAK DETECTOR WITH IMPROVED SIGNAL-TO-NOISE RESPONSE

[76] Inventors: Frederick T. Olender, 7 Bobolink La., Somers, Conn. 06071; Bernard A. Woody, 279 Sugar Hill Rd., Tolland, Conn. 06084; Leon A. Newman, 75 Cotswold Close, Glastonbury, Conn. 06033

[21] Appl. No.: 824,948

[22] Filed: Mar. 27, 1997

[51] Int. Cl.$^6$ .................... G01M 3/20; G01N 21/17
[52] U.S. Cl. .................. 73/40.5 A; 73/24.01; 73/592; 73/601; 73/40.7
[58] Field of Search ................ 73/40.5 A, 40.7, 73/24.01, 24.02, 592, 601

[56] References Cited

U.S. PATENT DOCUMENTS

| | | | |
|---|---|---|---|
| 2,449,166 | 9/1948 | Hershberger | 179/100.3 |
| 3,925,666 | 12/1975 | Allan et al. | 250/338 |
| 4,163,382 | 8/1979 | Amer | 73/24 |
| 4,172,382 | 10/1979 | Murphy et al. | 73/40.5 A |
| 4,372,149 | 2/1983 | Zharov | 73/24 |
| 4,394,573 | 7/1983 | Correa et al. | 250/253 |
| 4,412,445 | 11/1983 | Spellicy | 73/24 |
| 4,457,162 | 7/1984 | Rush et al. | 73/24 |
| 4,555,627 | 11/1985 | McRae et al. | 73/40.7 |
| 4,622,845 | 11/1986 | Ryan et al. | 73/24 |
| 4,635,042 | 1/1987 | Andrews | 73/40.5 A |
| 4,772,789 | 9/1988 | Maram et al. | 250/330 |
| 4,785,659 | 11/1988 | Rose et al. | 73/40.5 A |
| 5,103,675 | 4/1992 | Komninos | 73/592 |
| 5,129,255 | 7/1992 | Corbin | 73/24.02 |
| 5,161,408 | 11/1992 | McRae et al. | 73/40.7 |
| 5,450,193 | 9/1995 | Carlsen et al. | 356/301 |
| 5,581,017 | 12/1996 | Bejtlich, III | 73/38 |
| 5,616,826 | 4/1997 | Pellaux et al. | 73/24.02 |

OTHER PUBLICATIONS

Laser Imaging Systems, "LaserSonic LSA-3," Punta Gorda, FL, 2 pages.
Photonics Spectra, Apr. 1994, "Laser Applications," *Assembly-Line Leak Testing*, p. 114.
Brassington, D. J., "Photo-acoustic detection and ranging—a new technique for the remote detection of gases," J. Phys. D: Appl. Phys., 15 (1982), pp. 219–228.
Allen, Jr., John E. et al., "Optoacoustic pulses in a flame," Optics Letters, vol. 1, No. 4, Oct. 1977, pp. 118–120.

*Primary Examiner*—Hezron E. Williams
*Assistant Examiner*—J. David Wiggins
*Attorney, Agent, or Firm*—Gerald L. DePardo

[57] ABSTRACT

A photo-acoustic leak detection system for detecting a gas leaking from a component (30), includes at least one laser beam (20), incident on the component (30) and having a wavelength which is absorbed by the gas, the gas emitting a photo-acoustic signal (36) when the gas absorbs light from the beam (20), the beam (20) being pulsed at a pulse frequency, the pulse frequency being related to a detection frequency of the photo-acoustic signal and being a frequency at which the magnitude of background acoustic noise at the detection frequency is at a predetermined low level, at least one acoustic sensor (40), which receives the photo-acoustic signal (36) and provides a sensor signal on the line (42) indicative thereof to a filter (44) and a synchronous detector (18), which provide a filtered signal on a line (50) to a signal processor (52). The processor (52) provides an output signal on a line (54) indicative of the leak in the component. Setting such pulse frequency to a low level acoustic noise frequency allows the signal-to-noise response to be greatly increased.

35 Claims, 6 Drawing Sheets

PHOTO-ACOUSTIC LEAK DETECTOR WITH IMPROVED SIGNAL-TO-NOISE RESPONSE

Cross References to Related Applications

Copending U.S. patent application, Ser. No. 08/835,043, entitled "Photo-Acoustic Leak Detector With Multiple Beams", filed contemporaneously herewith, contains subject matter related to that disclosed herein.

1. Technical Field

This invention relates to leak detection and more particularly to photo-acoustic leak detection.

2. Background Art

Leak testing of various components (or systems) which are required to be gas-tight or liquid-tight, such as heat exchanger coils, fuel tanks, pressure vessels, fuel or hydraulic lines, etc., is a common step in the manufacturing process of such components. It is known in the art of leak testing to detect various structural flaws in components, such as leaky joints, cracks, porosity, and the like, by pressurizing the component with a gas and detecting trace quantities of the gas leaking from such components.

One way to detect such leaking gas is to use a known "photo-acoustic" effect. The photo-acoustic effect, as is known, occurs when gas absorbs light which is incident on the gas. When the wavelength of the incident light is absorbed by the gas, the absorbed optical energy heats the gas. As the heated gas expands, it produces pressure or acoustic waves, i.e., sound, which propagates from the point of heating. If the energy absorbed is of sufficient magnitude, the acoustic waves may be detected by an acoustic sensor, such as a microphone, which provides an electrical signal indicative of the acoustic waves. The electrical signal amplitude is related to tracer gas concentration, the laser pulse energy, tracer gas absorption intensity, and the interrogation volume, as is known. It is also known to use such photo-acoustic effect for detecting the location of leaks in the component or system under test.

One prior art photo-acoustic leak detection system uses a pulsed or scanned laser beam incident on the component under test and the component is pressurized with a gas which strongly absorbs the laser light. If a leak exists and the light is incident on the emerging gas, the gas absorbs the light and produces the aforementioned acoustic emission which is detected by a microphone or similar acoustic sensor. The electrical signal from the microphone is then used to notify the operator that a leak is present. Such a system is described in U.S. Pat. No. 5,161,408, entitled "Photo-Acoustic Leak Detection System and Method", to McRae et al.

Another prior art system which uses photo-acoustic detection is the system described in D. J. Brassington, "Photo-acoustic Detection and Ranging—a New Technique for the Remote Detection of Gases", Journal of Physics D: Applied Physics, 15 (1982), pages 219–228, which uses a pulsed laser to determine the presence and distance (or range) to a gas source or leak.

However, existing systems are very sensitive to background acoustic noise generated from sources than the leak being detected, which may cause erroneous leak readings.

DISCLOSURE OF THE INVENTION

Objects of the invention include provision of a photo-acoustic leak detection system which is not very sensitive to background acoustic noise.

According to the present invention a photo-acoustic leak detection system for detecting a gas leaking from a component, comprises at least one laser beam, incident on at least a portion of the component and having a wavelength which is absorbed by the gas, the gas emitting a photo-acoustic signal when the gas absorbs light from the beam; the beam being pulsed at a pulse frequency, the pulse frequency being related to a detection frequency of the photo-acoustic signal and the pulse frequency being a frequency at which the magnitude of background acoustic noise at the detection frequency is at a predetermined low level; acoustic sensor means, for receiving the photo-acoustic signal and for providing a sensor signal indicative of the photo-acoustic signal; and a signal processor, which receives the sensor signal and provides an output signal indicative of the leak in the component.

According further to the present invention, the predetermined low level is smaller than a predetermined minimum magnitude of the photo-acoustic signal by a predetermined ratio. According still further to the present invention, the pulse frequency is at least 10 KHz. According still further to the present invention, the detection frequency is substantially the same as the pulse frequency.

The present invention represents a significant improvement over prior art leak detection systems by greatly improving the photo-acoustic signal to background acoustic noise response of the system. The invention uses a laser pulse frequency at which the amount of background acoustic noise is at or below a predetermined acceptable level. Also, using a pulsed laser beam incident on the component allows a broad range of frequencies from which to obtain the best signal-to-noise response for a given environmental setting. Further, the invention may continuously, periodically, or on request, measure the background acoustic noise and indicate when the background noise is above an acceptable level, or scan the background acoustic noise spectrum to automatically select the laser pulse frequency to provide the desired signal-to-noise response.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 6, illustrations (a)–(d) show a series of time graphs for an optical pulse input and various response signals for three laser pulses, in accordance with the present invention.

FIG. 7, illustrations (a)–(g) show a series of time graphs for various signals within a synchronous detector of FIG. 1, in accordance with the present invention.

BEST MODE FOR CARRYING OUT THE INVENTION

Figure 1:
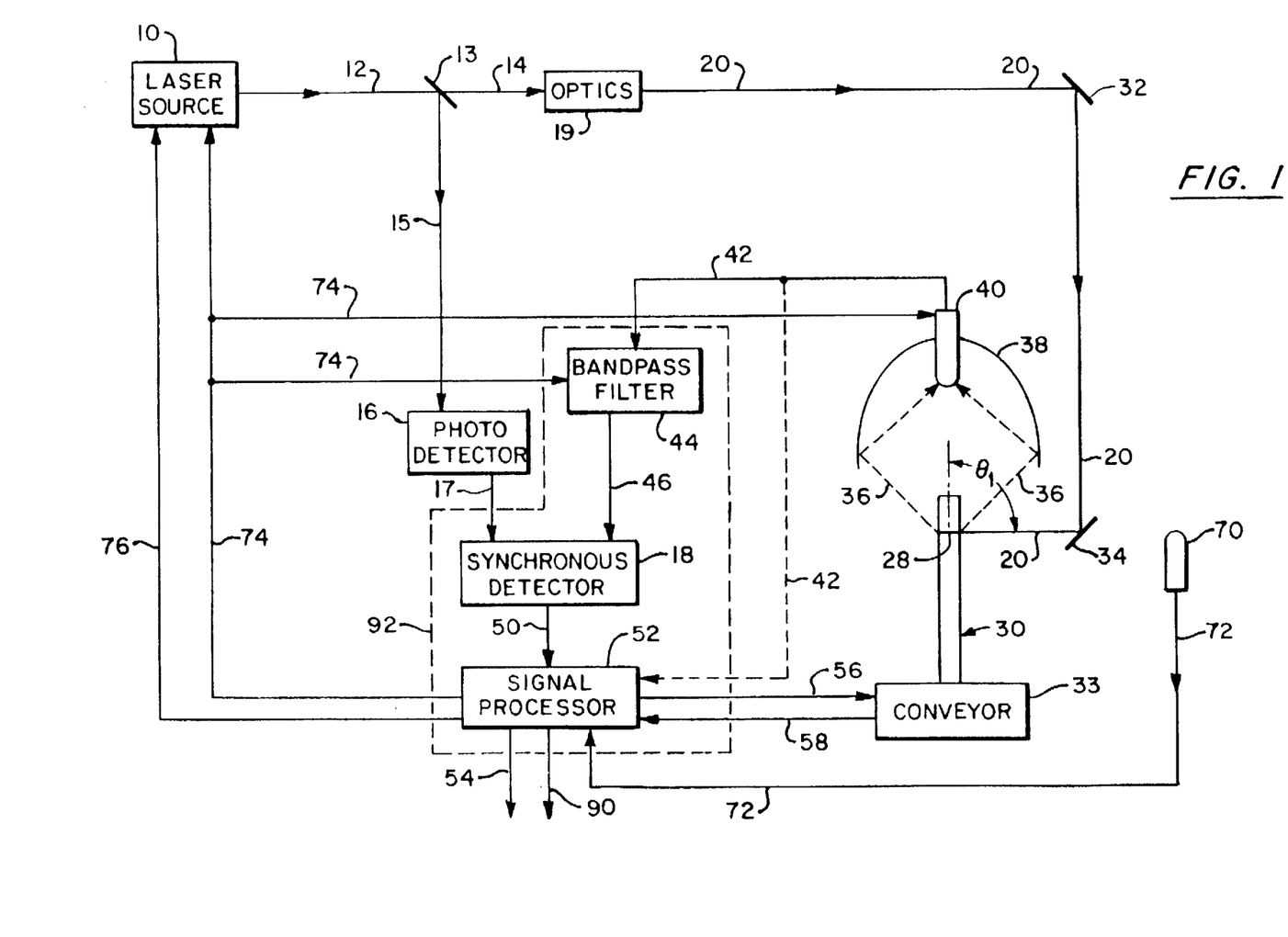
FIG. 1 is a schematic block diagram of a photo-acoustic leak detection system in accordance with the present invention.

Referring to FIG. 1, a photo-acoustic leak detection system comprises a high pulse repetition frequency (PRF)

laser 10, e.g., an LC40 Passively Q-Switched $CO_2$ infra-red laser made by DeMaria Electro-Optic Systems, which provides a laser light beam 12 which is pulsed at a pulse repetition frequency (PRF) or pulse frequency and has a wavelength $\lambda_1$. Any other laser pulsing techniques may be used if desired, e.g., a CW laser with a chopper. Also, any other laser or optical source which provides pulsed laser beams having the characteristics described herein may be used if desired. The beam 12 is linearly polarized; however, unpolarized or other polarized light (e.g., circularly, elliptical, etc.) may also be used. The beam 12 is incident on a 95/5 beam splitter 13 which passes 95% of the beam 12 as a passed beam 14 and reflects 5% of the beam 12 as a reflected reference 15. Other percentage ratio beam splitters may be used to provide the reference beam 15. The reference beam 15 is incident on a photodetector 16 which provides an electrical reference signal on a line 17 indicative of the reference beam 15. The electrical reference signal is fed to a synchronous detector 18 (or demodulator), discussed hereinafter.

The passed beam 14 is incident on known beam-forming optics 19, e.g., a telescope, which receives the beam 14 and provides an output beam 20 having the desired divergence and diameter for the intended application (discussed hereinafter). The beam 20 is incident on a mirror 32 which reflects the beam 20 to another mirror 34. The mirror 34 reflects the beam 20 onto the joint 28 of the component 30. Instead of some or all of the beam splitters and mirrors in FIG. 1, other optical components and arrangements may be used if desired to provide the beam 20 incident on the joint 28.

The beam 20 is a stationary beam and the component 30 moved along by a conveyor 33 in a direction normal to the page in FIG. 1, at a predetermined rate, e.g., 2 inches/second (5.08 cm/sec), allowing a predetermined inspection region 159 (FIG. 2) of the component (or portion thereof) to be illuminated (or exposed) by the beam. Other conveyor rates may be used if desired.

If there is any gas within the component 30 which leaks from the joint 28, acoustic waves 36 will propagate from the point at which the leaking gas (not shown) is illuminated by the pulsed beam 20, due to the photo-acoustic effect discussed hereinbefore in the Background Art section hereof. The frequency of the photo-acoustic wave signals 36 is the same as that of the pulse repetition frequency (PRF) of the pulsed laser beam 20.

The acoustic waves 36 are incident on an ellipsoidal (or elliptic) reflector 38 which reflects the acoustic waves 36 onto an acoustic sensor 40, e.g., a microphone. The acoustic waves 36 may also be directly incident on the microphone 40. The microphone 40 provides an electrical signal indicative of the acoustic waves 36 on a line 42. The microphone 40 is a Model 2520, made by Larson Davis Laboratories, having a diameter of about 0.25 inches (6.35 mm), a bandwidth of 100 KHz (within±2 dB) and a dynamic range of 164 dB (when the output contains 3% harmonic distortion). Any other microphone, diameter, bandwidth and/or dynamic range may be used if desired, provided it is capable of detecting the signal levels and frequencies expected for detection of the acoustic leak signal. Also, the bandwidth of the acoustic sensor 40 includes the PRF of the laser beam 12.

The ellipsoidal reflector 38 around the microphone 40 allows for peak acoustic sensitivity at both foci of the ellipse, as is known. One focus is at the leak location (the source of the acoustic waves), i.e., the joint 28, and the other focus is at the acoustic sensor membrane of the microphone 40. By peaking the acoustic response at specific locations, the reflector 38 reduces the effect of acoustic sensitivity to background acoustic noise from other sources unrelated to the leak location (discussed hereinafter). The diameter of the ellipsoidal reflector 38 for the microphone 40 is approximately 6 inches (15.24 cm) and the distance from the microphone to the joint 28 is approximately 1 foot (30.48 cm). Other distances, positioning, and diameters of the reflector 38 may be used, if desired. Also, instead of elliptical, the shape of the reflector 38 may be parabolic or hyperbolic, or other shapes if desired. Further, the reflector 38 may be omitted if desired; however, decreased signal-to-noise ratio may result. Also, instead of a microphone, any other acoustic sensor which can detect the photo-acoustic signals 36 may be used. Also, the signal provided to the filter 44 need not be electrical but may be optical, e.g., with an optical acoustic sensor, or another type of signal.

The line 42 is fed to a known bandpass filter 44 having a frequency response which passes frequencies in the passband and attenuates or blocks frequencies outside the passband, and provides a filtered output signal on the line 46 indicative thereof. The passband of the filter 44 is 7.6 KHz, with a range from 71.2 KHz to 78.8 KHz (3 dB points). The filter 44 comprises a low pass filter and a high pass filter connected in series to produce a bandpass frequency response. The transfer functions for each of the low pass and high pass filters is a Cauer-elliptic filter having 8 poles (roots of the denominator polynomial) and 6 zeros (roots of the numerator polynomial), Model Nos. 858L8EY and 858H8EY, respectively, made by Frequency Devices, of Haverhill, Mass. The resulting frequency response has a steep roll-off outside the passband and a time step response overshoot of approximately 20%. The passband of the filter 44 includes the pulse frequency of the laser beam 12 (which is also the acoustic frequency of the signal 36). Other passbands, rolloffs, and overshoots may also be used.

The bandpass filter 44 reduces the effects of unwanted background noise frequencies outside the filter passband. The frequency response of the bandpass filter 44 is selected to suit the noise environment that the detection system must support and to maximize the acoustic and electronic signal-to-noise ratio. Instead of a bandpass filter, other filter types may be used if desired, e.g., high pass filters or low pass filters, etc.

The filtered electrical signal on the line 46 is fed to the synchronous detector 18. The synchronous detector 18 comprises a known "lock-in" amplifier which has sufficient sensitivity and bandwidth to detect the signal level and bandwidth of the microphone signal on the line 42 (discussed more hereinafter). The reference (or sync) frequency of the detector 18 is the pulse repetition frequency (PRF) of the laser beam 12 provided on the line 17. The synchronous detector 18 samples the filtered signal on the line 46 synchronously with the PRF of the laser beam 12, and rejects noise outside the PRF. The synchronous detector 18 provides an electrical signal on a line 50 indicative of the acoustic energy at the laser PRF. Instead of the synchronous detector 18, any other narrow frequency band filters may be used if desired which may also replace the filter 44 (discussed more hereinafter).

The line 50 is fed to a signal processor 52 which determines whether or not a leak exists and/or the location and/or amount of the gas leak, and provides an electrical signal on a line 54 indicative thereof. The signal processor 52 comprises known electronic analog and/or digital components and the necessary signal processing, and/or interface capabilities sufficient to perform the functions described herein. Also, the signal processor 52 may comprise a programmed digital computer. The signal processor 52 samples the signal on the line 50 at a predetermined sample rate, e.g., 50 samples/second (50 Hz). Other sample rates or continuous time analog circuits may be used.

The signal processor 52 receives a position signal on a line 58 from the conveyor 33 indicative of the location of the component 30 and may also provide a position control signal on line 56 which controls the position of the component 30. Any other technique for determining where the beam 20 is incident on the component 30 may be used if desired.

The wavelength $\lambda_1$ of the pulsed laser beam 12 (and thus the beam 20) is selected to be a wavelength that is absorbed by the gas leaking from the joint 28. For a tracer gas of sulfur hexafluoride ($SF_6$), the wavelength $\lambda_1$ of the beam 20 for optimal absorption by the gas is 10.55 microns in the infra-red range. Other wavelengths within the $SF_6$ wavelength absorption range may be used if desired. Also, the beam 20 may comprise more than one wavelength which is absorbed by the gas. Further, other gases may be used if desired. In that case, the beam wavelength would be set to an absorption wavelength of the gas used.

In addition to the photo-acoustic signal 36 generated by the gas leak, acoustic signals are also produced from other sources, e.g., air compressors, noisy machinery, etc., known as background acoustic noise. Such acoustic noise may be so large as to be indistinguishable from acoustic signals generated by a gas leak.

We have found that if the PRF (or pulse frequency) of the laser beam 12 (and, thus, the beam 20) is set at a frequency where the magnitude of background acoustic noise is at or below a predetermined acceptably low level, the amount of background noise passed by the bandpass filter 44 and detected by the synchronous detector 18 is minimized. This occurs because the frequency of the acoustic signal 36 is substantially the same as the pulse repetition frequency (PRF) of the laser beam 12, as discussed hereinbefore. Such predetermined acceptable level is determined by the desired ratio of the photo-acoustic signal to the background acoustic noise, i.e., the signal-to-noise ratio (or response), whereby the magnitude of the background acoustic noise is smaller than a predetermined minimum magnitude of the photo-acoustic signal by such ratio. Any desired signal-to-noise ratio (greater than 1-to-1, to allow the signal to be distinguishable from the noise, as is known) may be used, depending on the application and the noise margin desired. For example, an acceptable low noise level is a three-to-one ratio below the photo-acoustic leak signal associated with the desired minimum leak detection sensitivity. Other smaller or larger ratios may be used if desired depending on the desired noise margin. Also, the method used for measuring the magnitude of the background acoustic noise and/or the photo-acoustic signal for determining a desired signal-to-noise ratio may be RMS (root mean square), peak, peak-to-peak, average, or other desired magnitude measurement technique, standard, or method.

The PRF for the laser beam 12 (and thus the beam 20) may be chosen by analyzing the background Acoustic noise frequency spectrum of the environment where the system will be used (e.g., a factory area), and determining the lowest background noise frequencies, which will correspond to the best PRF's for the laser. We have found that a PRF of 75 Khz produces acceptable noise immunity because the background acoustic noise in many factories is at acceptably low levels at this frequency. However, other PRFs may be used if desired, e.g., 10 Khz to 200 Khz, or any other frequencies as well. The maximum pulse frequency is a function of, inter alia, the bandwidth of the laser pulsing technique used, the high frequency response characteristics of the microphone, filters and other system components, and the relaxation time of the gas (discussed hereinbefore). The minimum pulse frequency is a function of, inter alia, the desired speed at which the component is to be inspected and the speed at which the component moves through the beams or the beams move across the component.

The leak detection system may also provide signal-to-noise measurement and alert the operator that the background acoustic noise at the pulse frequency that is above an acceptable level. Alternatively, the system may adjust the signal-to-noise response by measuring the background acoustic noise frequency over a predetermined frequency range (spectrum) and selecting the laser pulse frequency which provides the desired signal-to-noise response. Such measurement and/or adjustment may be performed periodically, continuously, or on request.

In particular, the microphone 40 may be used to measure the background acoustic noise level at the desired detection frequency of the photo-acoustic signal (i.e., the pulse frequency). In that case, signal processor 52 measures the background acoustic noise from the microphone 40 on the line 50 from the synchronous detector 18 at frequencies within the passband of the filter 44 and the detector 18, when the laser beam 20 is not illuminating the component 30, e.g., between laser pulses, or by turning the beam off at predetermined times. In particular, the signal processor 52 may provide a beam on/off signal on a line 76 to the laser 10 to turn the laser beam off between inspection of components on an assembly line or at other predetermined times, to allow for the measurement of background acoustic noise.

If the background acoustic noise is above an acceptable level, the signal processor 52 may provide a signal on a line 90 to notify the operator. In that case, the system may need to be re-calibrated to select a new pulse frequency which has an acceptable background acoustic noise level and thus, an acceptable signal-to-noise ratio.

The microphone 40 may also be used to measure background acoustic noise over a predetermined frequency range (or spectrum). In that case, the signal on the line 42 from the microphone 40 is fed directly to the signal processor 52 (in addition to being fed to the filter 44), as shown by the dashed line 42. The signal processor 52 samples the unfiltered acoustic signal on the line 42 when the beam 20 is not illuminating the component 30, in a similar manner to that discussed hereinbefore. The signal processor 52 performs known frequency response analysis (e.g., Fourier analysis) on the signal from the microphone 40 and determines the magnitude (or energy content) of the background acoustic noise over a predetermined frequency range (or spectrum).

Alternatively, a second acoustic sensor 70, e.g., a microphone, located near, e.g., 1 foot (30.48 cm) away from, the component 30 under test, may be used. Other distances may be used if desired. The microphone 70 may be used to provide a redundant broadband microphone, or, if the sensor 40 has a narrow bandwidth (e.g., around the pulse frequency), to provide the only broadband microphone. The microphone 70 provides an electrical signal on a line 72 to the signal processor 52. The microphone 70 measures the background acoustic noise over a predetermined frequency range (or spectrum) and provides a signal indicative thereof on the line 72 to the signal processor 52, depending on the application. The microphone 70 should be selected to provide the desired frequency range. Other types of acoustic sensors or microphones and more than one microphone may be used if desired to measure background acoustic noise. The signal processor 52 performs known frequency response analysis (e.g., Fourier analysis) on the signal from the microphone 70 and determines the magnitude (or energy content) of the background acoustic noise over a predetermined frequency range (or spectrum).

If the microphone 70 is sensitive enough and/or close enough to detect the photo-acoustic signals 36 from the component 30, the background acoustic noise from the microphone 70 may need to be sampled when the beam 20 is not illuminating the component 30. Also, the microphone 70 should be positioned such that it detects background acoustic noise similar to that detected by the microphone 40. Acoustic reflectors, similar to the reflector 38 may be used if needed to provide this effect.

The microphone 70 may be co-located (side-by-side or otherwise) with the microphone 40 within the reflector 38 (if the reflector 38 is used). In that case, the signal processor 52 may measure the background noise spectrum from the microphone 70 on the line 72 and/or from the microphone 40 on the line 42 as discussed hereinbefore.

Once the signal processor 52 has measured the background acoustic noise, it compares the measured background acoustic noise at the desired detection frequency of the photo-acoustic signal (i.e., the optical pulse frequency) to the aforementioned predetermined acceptable level to determine if the background acoustic noise is above this level. If the background acoustic noise is above the acceptable level, the signal processor 52 examines the aforementioned magnitude of background noise across the frequency spectrum to determine if there is another frequency at which the magnitude of the background acoustic noise is at or below the acceptable level. If so, the signal processor 52 provides a pulse frequency select signal on a line 74 to the laser source 10 to change the pulse frequency of the laser beam 12 to such frequency and to the bandpass filter 44 to change the passband to include such frequency. In that case, the laser source 10 would be a tunable pulse laser source and the filter 44 would be a tunable filter. If the filter 44 is implemented in software as part of the signal processor 52 (as discussed hereinafter), the signal processor 52 would change the appropriate filter characteristics directly (e.g., by changing certain filter coefficients and/or algorithms).

Alternatively, the signal processor 52 may continuously (or at a periodic rate) adjust the laser pulse frequency to a frequency at which the magnitude of the background noise is at the lowest magnitude or lower than the level at the current pulse frequency, thereby always maximizing or improving the signal-to-noise ratio.

Figure 8:
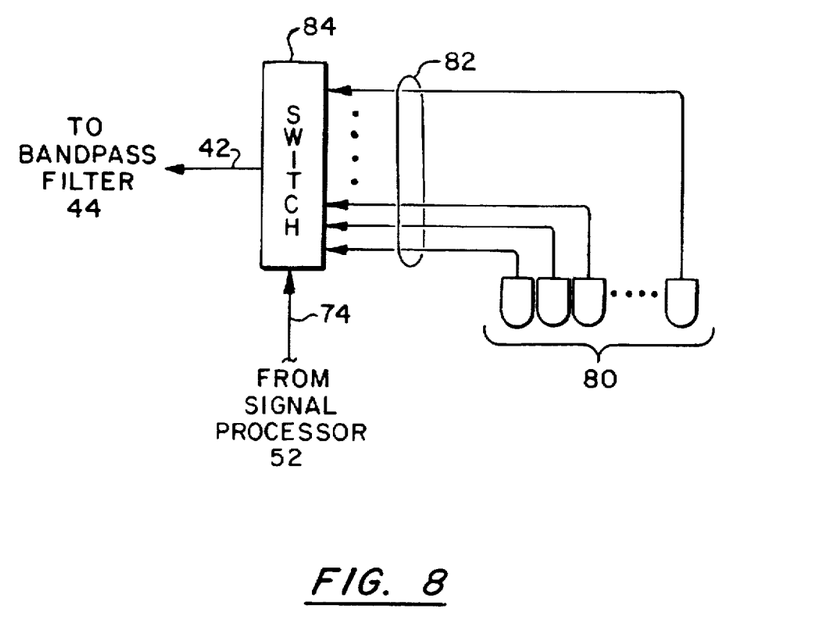
FIG. 8 is a schematic block diagram of an alternative embodiment of a photo-acoustic leak detection system, in accordance with the present invention.

Referring to FIG. 8, alternatively, if the sensor 40 is a narrow bandwidth acoustic sensor and a broad range of possible pulse frequencies is desired, a plurality of narrow band acoustic sensors 80 (e.g., microphones or other acoustic sensors) may be used instead of the single sensor 40. Each of the sensors 80 would have a different frequency bandwidth or passband center frequency, which may or may not overlap. The output signal from each of the sensors 80 is on lines 82 which are fed to a switch (or multiplexer) 84 and the output of the switch 84 is provided on the line 42 which is fed to the bandpass filter 44 (FIG. 1). The switch 84 is controlled by the pulse frequency select signal on the line 74 from the signal processor 52. The switch connects the appropriate one of the signals on the lines 82 from the sensors 80 to the line 42, based on the frequency select signal on the line 74 indicating which pulse frequency is selected. Other techniques may be used to select the appropriate signal from the sensors 80.

Referring to FIG. 1, alternatively, the acoustic sensor 40 may have a variable bandwidth and/or variable center frequency, which is adjustable based on an input signal on the line 74. Accordingly, in that case, the pulse frequency select signal on the line 74 is fed to both the variable acoustic sensor 40, to adjust the bandwidth and/or center frequency of the acoustic sensor 40, and to the laser 10, to adjust the laser pulse frequency. Separate select signals on separate lines from the signal processor 52 may be used to select the pulse frequency of the laser 10 and the bandwidth and/or center frequency of the acoustic sensor 40 if desired.

Other signal processing techniques may be used to set the pulse frequency to adjust or maintain a desired signal-to-noise response and/or to maximize the signal-to-noise response, if desired.

At the locations where the beam 20 is incident on the joint 28, the beam 20 has a diameter of approximately ⅜" (9.525 mm), approximately equal to the diameter of the joint 28 (see FIG. 2), it is a slightly divergent beam and has an average power of approximately 0.25–0.3 watts. The greater the optical power, the greater the acoustic return signal will be for a given leak. The beam 20 has a standard Gaussian power distribution across the beam diameter with 98% of the power radiating in the $TEM_{00}$ mode. The pulsed laser beam 20 comprises a series of short-duration pulses approximately 150 nanoseconds full-width-half-max (FWHM) in duration, every 13.33 microseconds, corresponding to a PRF of 75 Khz. For an average power of 0.25 to 0.3 Watts, the energy per pulse is approximately 3.33 to 4 micro-joules (Average Power/PRF). As discussed in the aforementioned Patent Application, the aforementioned beam characteristics generate sufficient acoustic levels to enable reliable leak detection of approximately 0.1 oz/year (or less) of the tracer gas $SF_6$.

Other leak levels may be sensed if desired, depending on the beam characteristics used. Also, other beam diameters, powers, power distribution profiles, and amount of divergence may be used if desired depending on the application, required sensitivity, component size, safety considerations, etc. For example, instead of a Gaussian power distribution, a "top-hat" or square distribution profile may be used. Also, optical apertures or other optical components may be used if desired to tailor the power profile of the beam 20 to the desired shape.

The beam diameter is determined by the size of the joint 28, the desired cross-sectional power distribution of the beam, the amount of vertical movement of the joint 28 (alignment tolerance), and the side view angle of incidence $\theta_1$ of the beam 20 from vertical to the joint 28 (in FIG. 1 shown as 90°). The beam 20 diameter need not be the same as the diameter of the joint 28, but may be smaller or larger than the joint 28 if desired. Instead of the beam 20 being a divergent beam, a collimated or focused beam may be used instead; however, a diverging beam provides maximum safety for operating personnel.

Other PRFs (or pulse frequencies) and pulse widths of the beam 20 may be used if desired. Also, the pulse shape may have any rise and/or fall shapes, if desired, e.g., Gaussian, rectangular, triangular, exponential, rounded, etc., and the rise and fall shapes need not be symmetric. Further, it suffices for the present invention that the optical pulse frequency is related to a parameter (e.g., the first or other harmonic(s)) of the photo-acoustic signal desired to be detected. Thus, the relationship between the optical pulse frequency and the desired detection frequency of the photo-acoustic signal need not be one-to-one. In the event the pulse frequency is not the same as the frequency of the photo-acoustic signal, the response of the filter 44 and the synchronous detector 18, and the frequency of the reference signal on the line 17, would be set to the desired detection frequency of the photo-acoustic signal, and the optical pulse frequency would be set based on the magnitude of the background noise at the desired detection frequency.

Also, as discussed in the aforementioned co-pending Patent Application, the time length of the optical pulses may be short compared to the overall period (i.e., a low percent duty cycle), since the heating of the target gas is substantially instantaneous and the resulting acoustic pressure pulse from the gas occurs on the rising edge of the energy pulse. An acoustic pressure pulse also occurs on the falling edge of the optical energy pulse. The time width (or time constant or relaxation time) of the pressure pulse generated from the gas (on either edge of the optical energy pulse) is approximately 1 microseconds based in the molecular relaxation of the absorbing gas. Other pressure pulse widths may exist depending on known photo-acoustic factors. Accordingly, if the laser pulse time of the beam 20 is increased to equal the width of the pressure pulse generated, this results in increasing the energy of the laser pulse, thereby proportionately increasing the average output power of the laser and reducing the safety of the system, without a corresponding increase in the acoustic signal improvement in leak detection. Therefore, a short duration optical pulse which deposits energy into the gas faster than the energy release time constant of the gas is more efficient and safe than along duration optical pulse. However, longer duration pulses may be used if desired.

Figure 2:
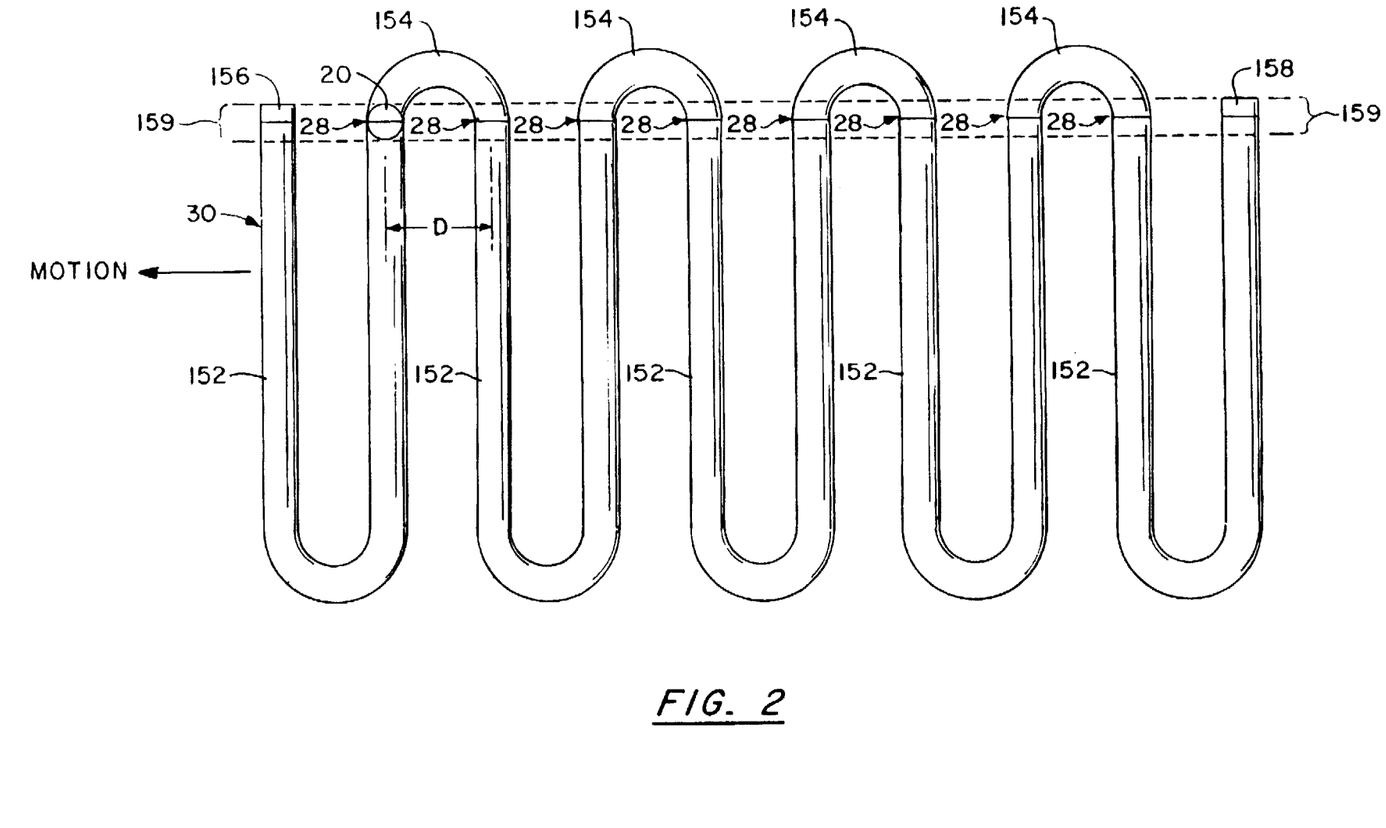
FIG. 2 is a side view of a heat exchanger coil and a beam incident thereon, in accordance with the present invention.

Referring now to FIG. 2, a right side view of the component 30 (FIG. 1) for a single row gas containment coil, e.g., tubing for a heat exchanger coil with the beam 20 incident thereon, is shown. The coil 30 comprises a series of U-shaped tubes 152 (or "hair-pins") which are single-piece copper tubing. These U-shaped tubes 152 are connected together by curved copper tubing 154 (or "return bends") which meet the tubes 152 at the joints 28. The U-shaped tubes 152 have a length of 24 to 100 inches, a diameter of approximately ⅜" (9.525 mm), and a wall thickness of approximately 0.017" (0.4318 mm). The distance D between the U-shaped tubes 152 is approximately 1" (2.54 cm) on center. Other lengths, thicknesses, diameters, distances (D), and materials may be used if desired. Also, there are end caps 156,158 at each end of the coil 30 to retain the gas pressure. Other known techniques may be used to retain the gas pressure. Also, any known plumbing connections may be used to pressurize the tube 30, such as releasable nozzle connections, etc.

Figure 3:
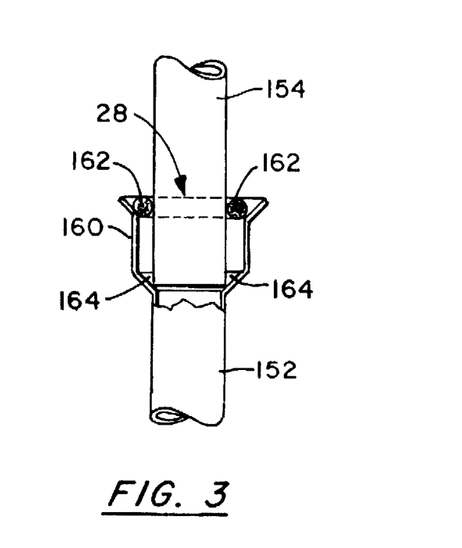
FIG. 3 is a blown-up side view of a joint of the coil of FIG. 2, in accordance with the present invention.

Referring now to FIG. 3, a blown-up drawing of one of the joints 28 inspected using the present invention shows a top region of the hair-pin tubes 152 having a flare 160 within which the return bend tube 154 is inserted. Brazing material 162 is placed between the tube 154 and the flange 160. Once brazed, the braze material 162 flows down and seals the regions 164 so as to provide an air (or liquid) tight seal between the return bend 154 and the tubes 152. Instead of brazing the joints 28 together, other bonding materials and techniques may be used if desired.

Figure 4:
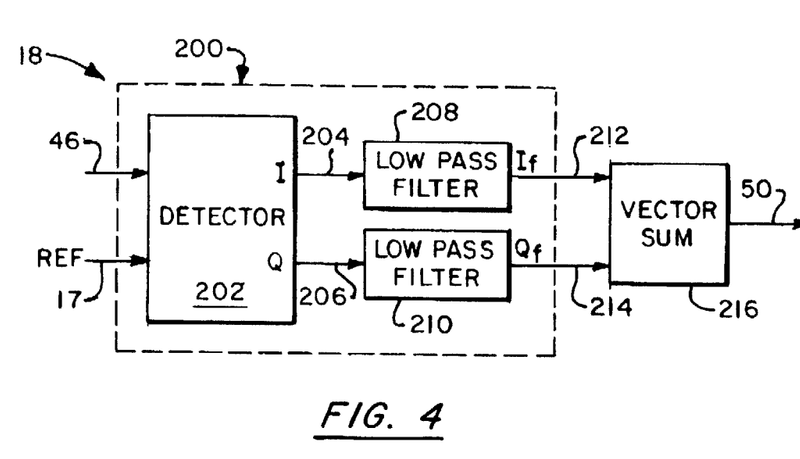
FIG. 4 is a schematic block diagram of a synchronous detector of FIG. 1, in accordance with the present invention.

Referring to FIG. 4, the synchronous detector 18 comprises a lock-in amplifier 200, e.g., an EG&G Instruments Corp. Model 5105, suitably modified to have a bandwidth of 75 KHz. The lock-in amp 200 comprises a detector 202 which provides a in-phase (I) signal on a line 204 and a quadrature (Q) signal on a line 206. The I signal represents a sampling of the input signal in phase with the reference signal and the Q signal represents a sampling of the input signal 90 degrees out of phase with the reference signal. The I and Q signals are fed to low pass filters 208,210, respectively, which provide filtered signals (If,Qf) on lines 212,214, respectively, which are fed to a vector sum circuit 216. The time constant for the filters 208,210 are each 10 milliseconds. Other time constants may be used if desired. The low pass filters 208,210 smooth out the response signals If,Qf on the lines 204,206, respectively.

The circuit 216 comprises known analog circuits, e.g., operational amplifiers and/or precision wide-band RMS-to-DC converters, which provide the vector sum the filtered signals If,Qf on the line 50, indicative of the square root of the sum of the squares $((If^2+Qf^2)^{1/2})$. Using the vector sum allows the output signal on the line 50 (FIG. 1) to be independent of phase shifts between the reference signal on the line 17 and the sampled signal on the line 46 from the filter 44.

Figure 5:
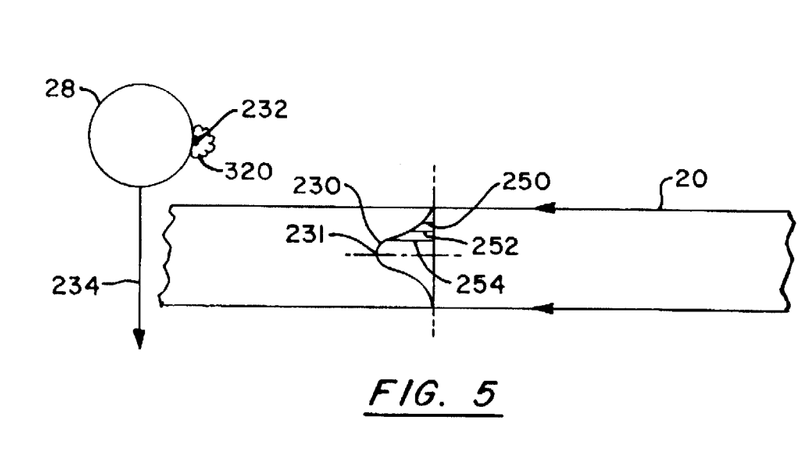
FIG. 5 is a top view of a beam showing a power distribution and a gas leak from a joint, in accordance with the present invention.
Figure 6A:
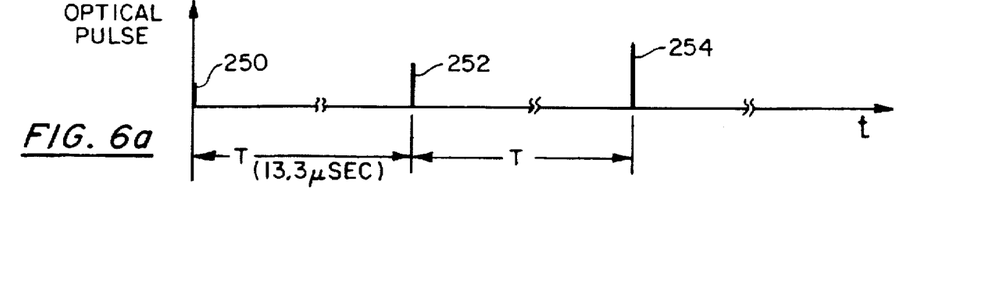
Figure 6B:
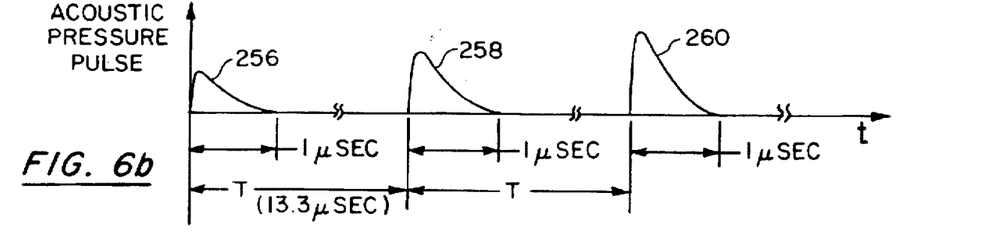
Figure 6C:
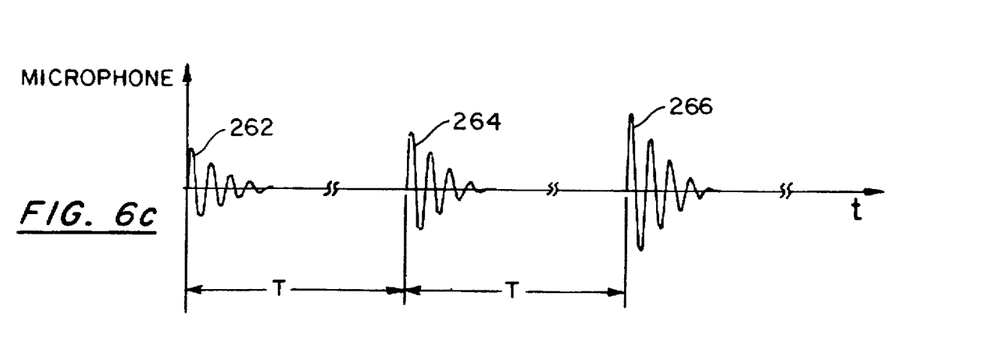
Figure 6D:
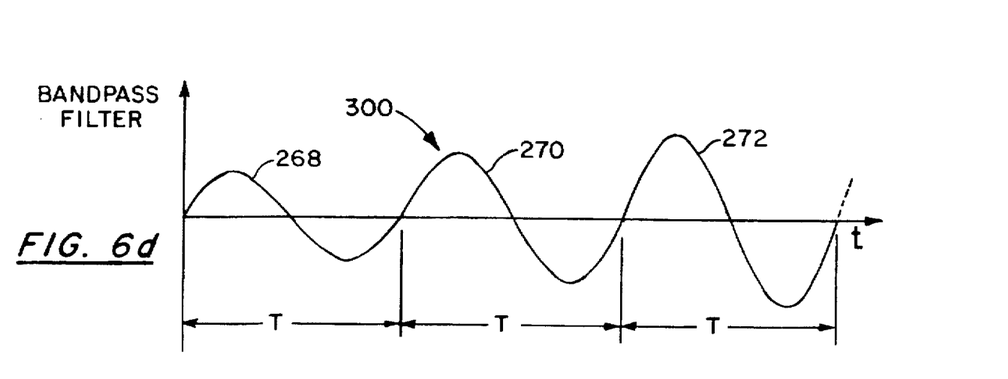
Figure 7A:
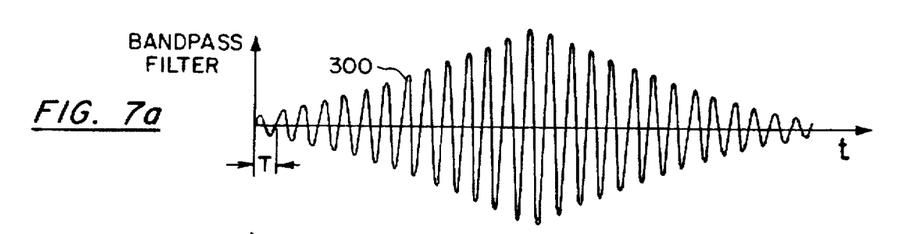
Figure 7B:
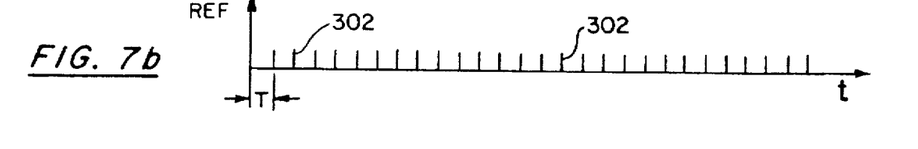
Figure 7C:
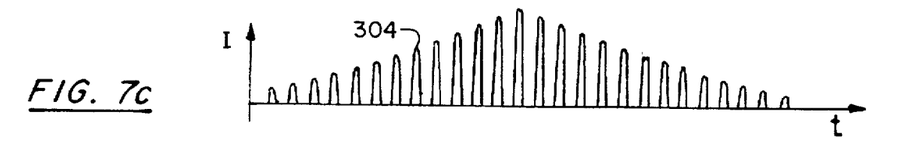
Figure 7D:
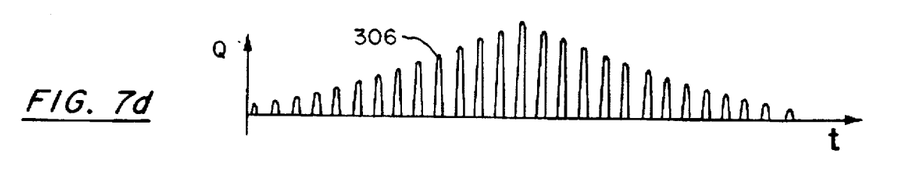
Figure 7E:
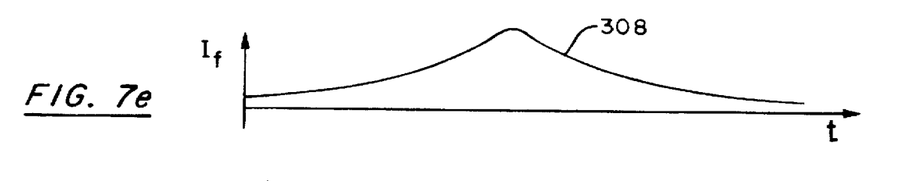
Figure 7F:
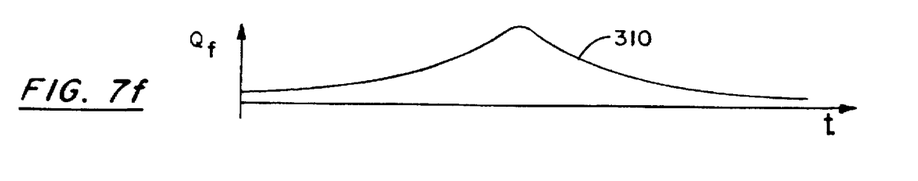
Figure 7G:
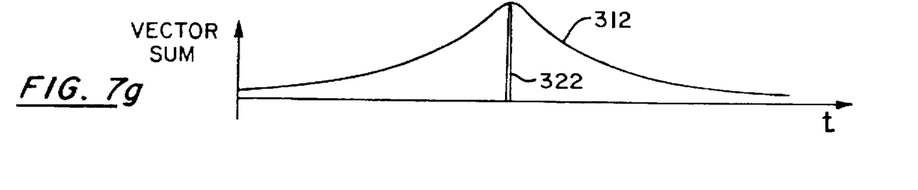

Referring to FIGS. 5, 6 and 7, for illustration purposes, the beam 20 has a Gaussian power profile 230 across the beam 20 cross-section having a peak power at a point 231, and the joint 28 has a constant point leak source 232, which passes across the beam 20 in the direction of an arrow 234. Referring to FIGS. 5 and 6, illustration (a), the beam 20 comprises optical pulses 250–254, having a narrow pulse width and spaced 13.33 microseconds (T) apart (corresponding to 75 KHz pulse frequency), and an intensity which varies depending on the portion of the beam 20 which is illuminating the leak 232, as indicated by the increasing height of the pulses 250–254. As the beam 20 moves across the leak 232, the power of the beam 20 seen by the leak 232 varies according to the profile 230. The three pulses 250–254 are chosen to illustrate three input pulses along the profile 230 (FIG. 5) and the various signal responses in FIG. 6.

Referring to FIG. 6, illustrations (a)–(d), when the leaking gas 232 absorbs the optical pulse 250, it produces an acoustic pressure pulse 256 which lasts approximately 1 microsecond, as discussed hereinbefore. The pulse 256 propagates to the microphone 40 which produces a damped oscillatory electrical signal 262 on the line 42 (FIG. 1) in response to the pulse 256 (FIG. 6). The shape of the curve 262 and whether it is smooth or oscillatory will depend on the bandwidth of the microphone 40. The signal 262 is fed to the bandpass filter 44 which provides a sinusoidal signal 268 indicative of the fundamental (or first) harmonic of the pulse frequency and an amplitude related to the amplitude of the microphone 40 response on the line 46 (FIG. 1).

Similarly, when the gas 232 absorbs the next optical pulse 252, having a higher power than the pulse 250, it produces an acoustic pressure pulse 258, which produces a microphone response 264, and a corresponding bandpass filter response 270, having an amplitude greater than the previous response single 268. Similarly, when the gas 232 absorbs the next optical pulse 254, having a higher power than the pulse 252, it produces an acoustic pressure pulse 260, which produces a microphone response 266, and a corresponding bandpass filter response 272, having an amplitude greater than the previous response signal 270. The waveforms 268–272 make-up a portion of a total bandpass filter response waveform 300 as the beam 20 passes across the leak 232, discussed hereinafter with FIG. 7.

It should be understood that the drawings in FIG. 6, illustrations (a)–(d), are for illustrative purposes only, are not to scale, and ignore time propagation delays, phase shifts of the filters, and noise. Also, the shapes of the various waveforms may differ from those shown.

Referring to FIG. 7, illustrations (a)–(g), as the beam 20 and the leak 232 pass across each other, the bandpass filter 44 provides the signal 300 on the line 50 (FIG. 1) to the synchronous detector 18, which has a peak amplitude which follows the power profile 230 (FIG. 5). Also, the reference signal on the line 17 provides pulses 302 which are 13.33 microseconds (T) apart (corresponding to the optical pulse frequency of 75 KHz). The I signal output of the detector 202 (FIG. 4) is indicated by a waveform 304, and the Q output (90 degrees out of phase with the I output) is indicated by a waveform 306 (FIG. 7). The filtered output If is indicated by a curve 308, the filtered output Qf is indicated by a curve 310, and the vector sum output on the line 50 is indicated by a curve 312. The shape of the curves 300, 304–312 follow the optical power profile 320 (FIG. 5). Accordingly, the shape of the curves 300,304-312 may be different if the optical power profile 230 has a different shape.

The actual number of pulses in the waveforms 300,304, 306 depends on the rate at which the beam 20 and the leak 232 pass each other. For a rate of 2 inches/second and a pulse rate of 75 KHz, there will be 37,500 pulses per inch of travel, or 37.5 pulses per 0.001 inches of travel. Also, instead of a point leak 232, there may be a larger leak 320 (FIG. 5). In that case, the number of pulses at the peak of the power curve will depend on the size of the gas leak cloud 320. The larger the gas cloud 320, the longer it takes the beam 20 to pass through the cloud 320 and, thus, the more pulses that will exist at the peak power.

Alternatively, the lock-in amplifier 200 (FIG. 4), the vector sum circuit 216, and the bandpass filter 44 (FIG. 1), may be replaced by a high Q bandpass filter followed by a half wave (or full wave) rectifier and then by a low pass filter (not shown). Also, any other types of detection or demodulation may be used if desired, e.g., synchronous or asynchronous, phase-sensitive or not phase-sensitive. Any other type of filtering or detection may be used to detect the energy at the pulse frequency.

Referring to FIGS. 1 and 7, illustration (g), in addition to background acoustic noise and photo-acoustic noise discussed herein, there may also be electrical noise 322 which may be coupled onto various electrical lines or circuits in the system. For example, noise may be coupled onto the line 46 between the filter 44 and the detector 18, or the line 50 between the detector 18 and the signal processor 52. Such electrical noise may be in the form of periodic or spurious noise spikes 322. The electrical noise spike 322 may be misinterpreted as an acoustic leak pulse if the magnitude of the spike is large enough. However, often such electrical noise spikes have a duration which is much shorter than the overall profile 312 over the illumination of a acoustic leak, which may be many milliseconds (discussed hereinbefore).

To eliminate erroneous leak readings due to such electrical noise, the signal processor 52 (FIG. 1) measures the time rate of change of the signal 312 received on the line 50 from the synchronous detector 18. For a beam with a diameter of ⅛ inch and a beam scan (or conveyor) rate of 2 inches per second, it takes about 0.1875 seconds for the beam to scan across a point leak. If the signal processor 52 samples at 50 Hz (0.02 seconds), it would take 9.4 samples of the signal 312 on the line 50. If the signal on the line 50 changes sharply, such as a change from a low level signal to a gas leak level in one or two samples, such sharp change is disregarded as noise. Other numbers of samples may be used.

More than one beam may be incident on the component 30, as discussed in the aforementioned copending Patent Application. For each beam incident on the component, multiple different non-absorbing and/or absorbing wavelengths may be used. If more than one beam is used, the beams may have different absorbed and/or non-absorbed wavelengths and/or different pulse frequencies. Also, the cross-sectional shape of the beam 20 may be any shape and/or dimension that provides the desired amount of illumination of a desired inspection region around the component 30 (or portion thereof) under test, e.g., long narrow rectangular cross-section beam (i.e., "sheet" beam) which illuminates (or exposes) a narrow section of the component 30 at any given instant in time during exposure may be used. Also, multiple microphones for detecting the photo-acoustic signal may be used.

Further, as discussed in the aforementioned copending Patent Application, instead of the beam 20 being stationary and moving the component 30 (e.g., the single row coil described in FIG. 2) under test through the beam 20, the beam 20 may be scanned or moved across the component 30. Alternatively, both the component 30 may be moved through the beam 20 and the beam 20 scanned across the component 30, at the same time or sequentially.

Further, even though the invention has been described as detecting leaks at joints in a component for illustrative purposes, it should be understood that the invention can inspect any point or region on a component or the entire component for gas leaks indicative of various structural flaws such as porosity, cracks, etc., as discussed in the aforementioned copending Patent Application.

Also, the non-leak photo-acoustic signal (or noise) calibration (or baseline measurement) techniques and embodiments discussed in the aforementioned Patent Applications may also be used with the present invention, such as use of airflow source and non-absorbing wavelength(s) in the beam (s) incident on the component under test.

Also, it should be understood that some or all of the functions shown as the blocks 44,18,52 in FIG. 1 may be implemented within the signal processor 52, as indicated by a dashed box 92, and may also be implemented by a programmed digital computer with the appropriate input/output interfaces, analog-to-digital or digital-to-analog converters, and memory sufficient to perform the functions described herein.

Further, terms relating to orientation, such as: top, bottom, vertical, horizontal, side, and the like, are relative terms and are used herein for illustrative purposes only. It should be understood that such terms depend on factors such as the orientation of the viewer, the leak detection system, and the component under test, and appropriate alternative terms may be substituted therefor in the event such orientations are different from the way they are presented herein, for a given application.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A photo-acoustic leak detection system for detecting a gas leaking from a component, comprising:

at least one laser beam for optically exciting the gas, wherein said beam is incident on at least a portion of the component and having a wavelength which is absorbed by the gas, the gas emitting a photo-acoustic signal when the gas absorbs light from said beam;

said beam being pulsed at a pulse frequency, said pulse frequency selected such that the magnitude of background acoustic noise at said pulse frequency is at a predetermined low level, wherein said predetermined low level of background acoustic noise creates a photo-acoustic signal to background acoustic noise ratio which is greater than one-to-one, said pulse frequency being related to a detection frequency of said photo-acoustic signal;

acoustic sensor means, for receiving said photo-acoustic signal and for providing a sensor signal indicative of said photo-acoustic signal; and a signal processor, which receives said sensor signal and provides an output signal indicative of the leak in the component.

2. The photo-acoustic leak detection system of claim 1 wherein said predetermined ratio is at least three-to-one.

3. The photo-acoustic leak detection system of claim 1, wherein said pulse frequency is at least: 10 KHz, 20 KHz, 30 KHz, 40 KHz, 50 KHz, 60 KHz, 70 KHz, 80 KHz, 90 KHz, or 100 KHz.

4. The photo-acoustic leak detection system of claim 1, wherein said pulse frequency is at least 75 KHz.

5. The photo-acoustic leak detection system of claim 1, wherein said detection frequency is substantially the same as said pulse frequency.

6. The photo-acoustic leak detection system of claim 1 further comprising optical means for providing said laser beam.

7. The photo-acoustic leak detection system of claim 6 wherein said optical means comprises reference means for providing a reference signal to said signal processor indicative of said laser beam.

8. The photo-acoustic leak detection system of claim 7, wherein said signal processor comprises at least one filter responsive to said sensor signal which provides an acoustical frequency filtered signal.

9. The photo-acoustic leak detection system of claim 8, wherein said signal processor comprises at least one synchronous detector responsive to said filtered signal and to said reference signal.

10. The photo-acoustic leak detection system of claim 1 wherein said signal processor comprises filter means for passing energy at said detection frequency and not passing energy outside said detection frequency.

11. The photo-acoustic leak detection system of claim 1, wherein said signal processor comprises a bandpass filter having a passband frequency range which includes said pulse frequency.

12. The photo-acoustic leak detection system of claim 1, wherein said sensor means comprises a microphone.

13. The photo-acoustic leak detection system of claim 1, wherein said sensor means comprises an acoustic reflector.

14. The photo-acoustic leak detection system of claim 1, wherein said component comprises a heat exchanger coil.

15. The photo-acoustic leak detection system of claim 1, wherein said beam is stationary.

16. The photo-acoustic leak detection system of claim 1, wherein said beam scans across the component.

17. The photo-acoustic leak detection system of claim 1, wherein said at least one beam comprises a plurality of beams.

18. The photo-acoustic leak detection system of claim 1, wherein said output signal is indicative of the location of the leak on the component.

19. The photo-acoustic leak detection system of claim 1, wherein said output signal is indicative of the amount of the gas leak on the component.

20. The photo-acoustic leak detection system of claim 1 wherein said signal processor measures said background acoustic noise at said detection frequency when the component is not illuminated by said beam.

21. The photo-acoustic leak detection system of claim 1 wherein said sensor means measures said background acoustic noise over a predetermined frequency range and provides a noise signal indicative of said background acoustic noise to said signal processor.

22. The photo-acoustic leak detection system of claim 21:

wherein said signal processor receives said noise signal and provides a frequency signal indicative of a desired frequency for said pulse frequency; and further comprising a variable laser source which provides said beam and which adjusts said pulse frequency in response to said frequency signal.

23. The photo-acoustic leak detection system of claim 22 wherein said signal processor measures said noise signal when the component is not illuminated by said beam.

24. The photo-acoustic leak detection system of claim 22 wherein said signal processor comprises a filter having a passband which varies with said pulse frequency.

25. The photo-acoustic leak detection system of claim 22 wherein said sensor means has a frequency response which varies with said pulse frequency.

26. The photo-acoustic leak detection system of claim 22 wherein said sensor means comprises a first acoustic sensor to measure said background noise and a second acoustic sensor to measure said photo-acoustic signal.

27. The photo-acoustic leak detection system of claim 1, wherein said pulse of said beam comprises optical pulses having an optical pulse frequency bandwidth.

28. The photo-acoustic leak detection system of claim 27, wherein said optical pulse frequency bandwidth is small compared to a pressure pulse frequency bandwidth of said photo-acoustic signal.

29. A method for detecting a gas leaking from a component, comprising the steps of:

illuminating at least a portion of the component by at least one laser beam incident on the component, said beam having a wavelength which is absorbed by the gas, the gas emitting a photo-acoustic signal when the gas absorbs light from said beam;

pulsing said laser beam at a pulse frequency, said pulse frequency being related to a detection frequency of said photo-acoustic signal and said pulse frequency being a frequency at which the magnitude of background acoustic noise at said detection frequency is at a predetermined low level, wherein said predetermined low level of background noise creates a photo-acoustic signal to background noise ratio which is greater than one-to-one;

measuring said acoustic signal and providing a sensor signal indicative of said photo-acoustic signal; and providing an output signal indicative of the leak in the component in response to said sensor signal.

30. The method of claim 29 wherein said predetermined ratio is at least three-to-one.

31. The method of claim 29, wherein said pulse frequency is at least: 10 KHz, 20 KHz, 30 KHz, 40 KHz, 50 KHz, 60 KHz, 70 KHz, 80 KHz, 90 KHz, or 100 KHz.

32. The method of claim 29, wherein said pulse frequency is at least 75 KHz.

33. The method of claim 29, further comprising a step of measuring said background acoustic noise over a predetermined frequency range.

34. The method of claim 33, wherein said step of measuring is performed when said beam is not illuminating the component.

35. The method of claim 33, further comprising a step of varying said pulse frequency to a frequency where the magnitude of said background acoustic noise at said detection frequency is below a predetermined noise level.

* * * * *

UNITED STATES PATENT AND TRADEMARK OFFICE
CERTIFICATE OF CORRECTION

PATENT NO : 5,780,724
DATED : July 14, 1998
INVENTOR(S): Frederick T. Olender et al.

It is certified that error appears in the above-identified patent and that said Letters Patent is hereby corrected as shown below:

On the Title Page, insert the name of the Assignee as follows:

--Assignee: United Technologies Corporation
　　　　　　Hartford, Conn.--

Signed and Sealed this

Twenty-ninth Day of June, 1999

*Attest:*

Q. TODD DICKINSON

*Attesting Officer*　　　　　*Acting Commissioner of Patents and Trademarks*